UNITED STATES PATENT OFFICE.

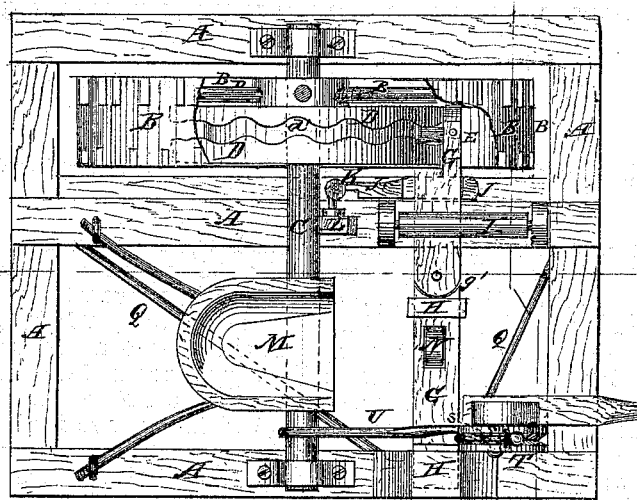

JOHN CLARRIDGE, OF MOUNT STERLING, OHIO.

IMPROVEMENT IN MOWING-MACHINES.

Specification forming part of Letters Patent No. 127,220, dated May 28, 1872.

Specification describing a new and useful Improvement in Reapers and Mowers, invented by JOHN CLARRIDGE, of Mount Sterling, in the county of Madison and State of Ohio.

Figure 1 is a top view of my improved machine, part of the drive-wheel being broken away to show the construction. Fig. 2 is a detail cross-section of the same taken through the line $x\ x$, Fig. 1, part of the drive-wheel being broken away to show the construction. Fig. 3 is a detail longitudinal section of the same taken through the line $y\ y$, Fig. 1.

Similar letters of reference indicate corresponding parts.

The invention consists in combining certain parts of a harvester as and for the purpose hereinafter fully described and pointed out in the claim.

A represents the frame-work of the machine. B is the drive-wheel, which is attached to the shaft C so as to carry the said shaft with it in its revolution. The shaft C revolves in bearings in the frame A. To the inner side of the drive-wheel B or to the shaft C is attached a wheel or rim, D. The rim of the wheel B is made wide and to project upon the inner sides of the spokes, so as to cover and protect the wheel or rim D. In the face of the wheel or rim D is formed a zigzag groove, $d'$, as shown in Figs. 1 and 2. E is a friction-roller, which is so formed as to fit into and pass along the zigzag groove $d'$ of the wheel D. The friction-roller E is placed upon a pin, F, which is attached to the end of the bar G, which slides back and forth longitudinally, in keepers H attached to the frame A as the friction-roller E moves through the groove $d'$. The bar G has a joint, $g'$, formed in it, as shown in Figs. 1 and 2, so that the end of said bar with which the roller E is connected may be thrown forward to remove said roller from the groove $d'$ when desired. The jointed end of the bar G is held down to its place by the two friction-rollers I, between which it passes, and which are pivoted to the frame A. The jointed end of the bar G rests in and is held to its place and moved laterally by the slide J, which slides upon the frame A, and to the rear end of which is pivoted the lower end of the lever K, which is pivoted to a standard, L, attached to the frame A, and its upper end projects upward into such a position that it may be conveniently reached and operated by the driver from his seat M to throw the roller E into and out of the groove $d'$ of the wheel D. In the sliding bar G is a slot or recess, in which the upper end of the lever N operates, which is made round and fits into a slot, recess, or socket formed in the bar G, so as to lose no motion when the direction of motion is changed, and which passes down through a slot in the cross-bar $a'$ of the frame A, above which the sliding bar G is placed. The lever N is pivoted to the cross-bar $a'$, and to its lower end is pivoted the inner end of the pitman O that drives the cutter-bar. P is the shoe, to which the inner end of the finger-bar is attached, and which is connected with the front and rear parts of the frame A by the braces Q, the outer ends of which are pivoted to the said shoe P, and their inner ends are pivoted to the front and rear parts of the further side of the frame A. To the shoe P are pivoted the ends of the bail R, to which is attached the lower end of a rope or chain, S, which passes around and is attached to a wheel or cam, T, to which is attached a lever, U, so that the shoe P, and with it the finger and cutter-bars, may be raised when and to any extent desired. The side of the frame A opposite the drive-wheel B is supported upon a small wheel, V, pivoted to the lower end of a standard, W, the upper end of which is attached to the said frame A.

Having thus described my invention, I claim as new and desire to secure by Letters Patent—

The slide J and rollers I I combined, as described, with jointed bar G to hold it in or out of working position, as set forth.

JOHN CLARRIDGE.

Witnesses:
J. H. SCHRYVER,
W. H. RIGGIN.